(12) United States Patent
Romanov et al.

(10) Patent No.: US 10,038,374 B2
(45) Date of Patent: Jul. 31, 2018

(54) APPARATUS FOR PRODUCING UNVARYING DIRECT LOAD CURRENT

(71) Applicant: Closed-up Joint stock compasny DRIVE, Novosibirsk (RU)

(72) Inventors: Yuriy I. Romanov, Novosibirsk (RU); Stanislav V. Maletskiy, Novosibirsk (RU)

(73) Assignee: Drive CJSC, Novosibirsk (RU)

( * ) Notice: Subject to any disclaimer, the term of this patent is extended or adjusted under 35 U.S.C. 154(b) by 0 days.

(21) Appl. No.: 15/439,353

(22) PCT Filed: Aug. 26, 2014

(86) PCT No.: PCT/RU2014/000640
§ 371 (c)(1),
(2) Date: Feb. 22, 2017

(87) PCT Pub. No.: WO2016/032358
PCT Pub. Date: Mar. 3, 2016

(65) Prior Publication Data
US 2018/0109182 A1   Apr. 19, 2018

Related U.S. Application Data

(63) Continuation-in-part of application No. 15/310,445, filed on Nov. 11, 2016.

(51) Int. Cl.
*H02M 3/156* (2006.01)

(52) U.S. Cl.
CPC .................................. *H02M 3/156* (2013.01)

(58) Field of Classification Search
CPC .... H02M 3/155; H02M 3/1588; H02M 3/156; H02M 3/158; H02M 3/22; H02M 3/24; H02M 3/28; H02M 3/325; H02M 3/335; H02M 3/33507; H02M 3/33523; H02M 3/3353; H02M 3/33538; H02M 3/33546; H02M 3/33553; H02M 2001/0003; H02M 2001/0045; H02M 2001/0009; H02M 2003/1566; G05F 1/46; G05F 1/461; G05F 1/462; G05F 1/56; G05F 1/565; G05F 1/569; G05F 1/575
USPC ........ 323/205–211, 222–226, 266, 271–276, 323/282–287, 311, 312, 351; 363/15–21.18, 40–43, 73, 74, 95–99,
(Continued)

(56) References Cited

U.S. PATENT DOCUMENTS

| | | | | | |
|---|---|---|---|---|---|
| 3,702,961 A | * | 11/1972 | Erickson | ............. | H02M 3/3385 331/112 |
| 2016/0141966 A1 | * | 5/2016 | Huang | ............. | H02M 3/33523 363/21.15 |

* cited by examiner

*Primary Examiner* — Timothy J Dole
*Assistant Examiner* — Carlos Rivera-Perez
(74) *Attorney, Agent, or Firm* — Patentagar PLLC; Alexander Rabinovich (57) ABSTRACT

An apparatus for producing unvarying direct load current comprises a direct voltage source connected to a DC-to-pulse voltage converter connected through a first galvanic decoupler to a pulse-to-DC voltage converter connected to a first terminal of the load. Another terminal of the load is connected to a DC stabilizer connected to a control circuit which is connected through a second galvanic decoupler to a control input of the DC-to-pulse voltage converter. Disclosed are three versions of the apparatus differing by the way the load is connected. The apparatus provides unvarying direct current flowing through the load that can vary within a wider load range.

3 Claims, 6 Drawing Sheets

(58) Field of Classification Search
USPC ......... 363/131–134; 315/119–128, 186, 189, 315/291–311
See application file for complete search history.

APPARATUS FOR PRODUCING UNVARYING DIRECT LOAD CURRENT

BACKGROUND OF THE SOLUTIONS

1. Field of the Solutions

The present engineering solutions relate to electrical engineering and can be used in power supply systems providing an unvarying direct current flowing in a load circuit where the load varies through a wide range.

2. Description of the Related Art

Known have been similar solutions, such as a linear voltage regulator with continuous-pulse regulation (SU1229742,publ. May 7, 1986), which comprises the following set of essential features:

- a DC voltage source;
- a DC voltage—pulse voltage converter (DCPVC) which is connected by its input to the output of the DC voltage source;
- a pulse voltage—DC voltage converter (PDCVC), its input being connected to the output of the DCPVC (DLC-filter);
- a linear voltage stabilizer connected by its input to the output of the PDCVC;
- a first voltage divider connected in parallel to the PDCVC;
- a second voltage divider connected between the output of the linear voltage stabilizer and the negative terminal of the DC voltage source;
- a load connected by one of its terminals to the output of the voltage linear stabilizer and by another terminal to the negative terminal of the DC voltage source;
- a control circuit connected by its first input to the output of the first voltage divider, by its second input to the output of the second voltage divider, and by its output to a control input of the DCPVC.

Common features of the present solutions and the above-characterized prior art regulator are:

- the DC voltage source;
- the DCPVC connected by its input to the output of the DC voltage source;
- the PDCVC;
- the load;
- the control circuit connected by its output to the control input of the DCPVC.

Also known has been an analogous device, see a description of a direct current source "100 W Single Output LED Power Supply HVGC-100 series" disclosed by Mean Well Enterprises Co. on Mar. 20, 2012 at http://lib.chipdip.ru/577/DOC000577435.pdf. The device is considered the closest analogue—the prototype, and it comprises the following set of essential features:

- a DC voltage supply;
- a DCPVC connected by its input to the output of the DC voltage source;
- a first galvanic decoupler including a transformer connected by its inputs (by terminals of its primary winding) to outputs of the DCPVC;
- a PDCVC connected by its inputs to terminals of a secondary winding of the transformer of the first galvanic decoupler;
- a load connected by its terminals to outputs of the PDCVC;
- a first overload protection circuit connected by its input to a negative terminal of the PDCVC;
- an error signal separation circuit connected by its first input to an output of the first overload protection circuit and by its second input to a positive terminal of the PDCVC;
- a first surge voltage protection circuit connected by its input to the positive terminal of the PDCVC;
- a second galvanic decoupler connected by its input to an output of the error signal separation circuit;
- a third galvanic decoupler connected by its input to an output of the first surge voltage protection circuit;
- a control circuit connected by its first input to an output of the second galvanic decoupler, by its second input to an output of the third galvanic decoupler and by its output to a control input of the DCPVC;
- a second overload protection circuit connected by its input to a respective output of the DCPVC and by its output to a third input of the control circuit.

Common features of the present solutions and the prototype are:

- the DC voltage supply;
- the DCPVC connected by its input to the output of the DC voltage source;
- the first galvanic decoupler connected by its inputs (by terminals of its primary winding0 to the outputs of the DCPVC;
- the PDCVC connected by its inputs to the outputs of the first galvanic decoupler (to the terminals of the secondary winding of the transformer of the first galvanic decoupler);
- the load connected by its first terminal to the output of the PDCVC;
- the second galvanic decoupler;
- the control circuit.

SUMMARY OF THE SOLUTIONS

The technical result, which neither of the above-characterized prior art solutions is able to achieve, lies in providing an unvarying value of the load direct Current where the load can vary through a wider range.

The cause of the failure to achieve the above technical result is that issues related to the expansion of the range of values of the load resistance in the prior art devices for producing a direct load current have not been given proper attention, since it was believed that the load range values already achieved easily meet the requirements of the present time.

Given the characteristics and analysis of prior art, it can be concluded that the task of providing an apparatus for generating unvarying DC current flowing through a variable load having a wider range of values of the load resistance has been relevant.

According to the first one of the proposed solutions, the technical result mentioned above is achieved by providing an apparatus for producing a direct unvarying current flowing through a load, the apparatus comprising a DC voltage source; a DCPVC connected by its inputs to outputs of the DC voltage source; a first galvanic decoupler connected by its inputs to outputs of the DCPVC; a PDCVC connected by its inputs to outputs of the first galvanic decoupler; a load connected by its first terminal to an output of the PDCVC; a second galvanic decoupler; and a control circuit; the apparatus also comprising a DC stabilizer connected by its input to a second terminal of the load and to a first input of the control circuit and by its output to a second input of the control circuit, which is connected by its output via the second galvanic decoupler to a control input of the DCPVC.

The use of the DC stabilizer—connected by its input, according to the first one of the proposed solutions, to the second terminal of the load and to the first input of the control circuit, and by its output to the second input of the control circuit which is connected by its output via the second galvanic decoupler to the control input of the DCPVC—makes it possible to stabilize a voltage drop at the DC stabilizer at the lowest level possible and, thus, to secure obtaining an unvarying value of the direct current flowing through a variable load through a wider load range. This results from controlling the process of converting a DC voltage into a pulse voltage by means of a control signal coming from the output of the second galvanic decoupler (which ensures the transmitting of a signal without an electric contact, rules out the appearance of parasitic currents on a ground bus caused by a potential difference of the grounds remote from each other, and, thus, lowers inductive pick-ups caused by those currents, also protecting equipment and personnel against electric shock) and supplying the pulse voltage, which was formed upon the DC-to-pulse voltage conversion, via the first galvanic decoupler (which ensures the transmitting of the pulse voltage without an electric contact, rules out the appearance of parasitic currents on a ground bus caused by a potential difference of the grounds remote from each other, and, thus, lowers inductive pick-ups caused by those currents, also protecting equipment and personnel against electric shock), to the input of the voltage converter of the pulse voltage to the DC voltage, which is applied via the variable load to the DC stabilizer, which ensures flowing the unvarying current through the variable load. This also results from using the voltage coming from the respective load terminal to the first input of the control circuit, from using the voltage coming from the DC stabilizer to the second input of the control circuit, and from applying the control signal from the output of the control circuit to the input of the second galvanic decoupler.

At that, the maximum output voltage at the load, when the load current s stabilized, is only limited by maximum admissible values of voltages for the elements used in the PDCVC. These voltages can be large enough, therefore load resistance can vary through wide limits.

Thus, a flow of DC of unvarying value in a broader range of load changes is secured, and this manifests the achievement of the above-identified technical result according to the first of the proposed solutions.

According to the second one of the proposed solutions, the technical result mentioned above is achieved by providing an apparatus for producing a direct unvarying current flowing through a load, the apparatus comprising a DC voltage source; a DCPVC connected by its inputs to outputs of the DC voltage source; a first galvanic decoupler connected by its inputs to outputs of the DCPVC; a PDCVC connected by its inputs to outputs of the first galvanic decoupler; a load connected by its first terminal to an output of the PDCVC; a second galvanic decoupler; and a control circuit; the apparatus also comprising a DC stabilizer connected by its input to a second terminal of the load, to a negative terminal of the DC voltage source, and to a first input of the control circuit and by its output to a second input of the control circuit, which is connected by its output via the second galvanic decoupler to a control input of the DCPVC.

The use of the DC stabilizer—connected by its input, according to the second one of the proposed solutions, to the second terminal of the load, to the first input of the control circuit, and to the negative terminal of the DC voltage source, and by its output to the second input of the control circuit which is connected by its output via the second galvanic decoupler to the control input of the DCPVC—makes it possible to stabilize a voltage drop at the DC stabilizer at the lowest level possible and, thus, to secure obtaining an unvarying value of the direct current flowing through a variable load through a wider load range. This results from controlling the process of converting a DC voltage into a pulse voltage by means of a control signal coming from the output of the second galvanic decoupler (which ensures the transmitting of a signal without an electric contact between the control circuit and DCPVC) and supplying the pulse voltage, which was formed upon the DC-to-pulse voltage conversion, via the first galvanic decoupler (which ensures pulse voltage transmitting without an electric contact between the DCPVC and PDCVC) to the input of the voltage converter of the pulse voltage to the DC voltage, which is applied via the variable load to the DC stabilizer, which ensures flowing the unvarying current through the variable load. This also results from using the voltage coming from the second load terminal connected to the negative terminal of the DC voltage source to the first input of the control circuit, from using the voltage coming from the output of the DC stabilizer to the second input of the control circuit, and from applying the control signal from the output of the control circuit to the input of the second galvanic decoupler.

At that, the maximum output voltage at the load, when the load current s stabilized, is only limited by maximum admissible values of voltages for the elements used in the PDCVC. These voltages can be large enough, therefore load resistance can vary through wide limits.

Thus, a flow of DC of unvarying value in a broader range of load changes is secured, and this manifests the achievement of the above-identified technical result according to the second one of the proposed solutions.

According to the third design of the proposed ones, the technical result mentioned above is achieved by providing an apparatus for producing a direct unvarying current flowing through a load, the apparatus comprising a DC voltage source; a DCPVC connected by its inputs to outputs of the DC voltage source; a first galvanic decoupler connected by its inputs to outputs of the DCPVC; a PDCVC connected by its inputs to outputs of the first galvanic decoupler; a load connected by its first terminal to an output of the PDCVC; a second galvanic decoupler; and a control circuit; the apparatus also comprising a DC stabilizer connected by its input to a second terminal of the load and to a first input of the control circuit and by its output to a second input of the control circuit, which is connected by its output via the second galvanic decoupler to a control input of the DCPVC, the first terminal of the load being also connected to a negative terminal of the DC voltage source.

The use of the DC stabilizer—connected by its input, according to the third solution of the proposed solutions, to the second terminal of the load, to the first input of the control circuit, and by its output to the second input of the control circuit which is connected by its output via the second galvanic decoupler to the control input of the DCPVC, the load being connected by its first terminal also to the negative terminal of the DC voltage source,—makes it possible to stabilize a voltage drop at the DC stabilizer at the lowest level possible and, thus, to secure obtaining an unvarying value of the direct Current flowing through a variable load through a wider load range. This results from controlling the process of converting a DC voltage into a pulse voltage by means of a control signal coming from the output of the second galvanic decoupler (which ensures the transmitting of a signal without an electric contact between the control circuit and DCPVC) and supplying the pulse voltage, which was formed upon the DC-to-pulse voltage conversion, via the first galvanic decoupler (which ensures pulse voltage transmitting without an electric contact between the DCPVC and PDCVC) to the input of the voltage converter of the pulse voltage to the DC voltage, which is applied via the variable load to the DC stabilizer, which ensures flowing the unvarying current through the variable load. This also results from using the voltage coining from the first terminal of the load to the first input of the control circuit, from using the voltage coming from the output of the DC stabilizer to the second input of the control circuit, and from applying the control signal from the output of the control circuit to the input of the second galvanic decoupler.

At that, the maximum output voltage at the load, when the load current is stabilized, is only limited by maximum admissible values of voltages for the elements used in the PDCVC. These voltages can be large enough, therefore load resistance can vary through wide limits.

Thus, a flow of DC of unvarying value in a broader range of load changes is secured, and this manifests the achievement of the above-identified technical result according to the third solution of the proposed solutions.

The analysis of the prior art showed that none of them contains both the totality of essential features of the proposed technical solutions and distinctive features thereof, that led to the conclusion of the present apparatuses for generating unvarying load current meeting the patentability criteria of "novelty" and "inventive step".

BRIEF DESCRIPTION OF DRAWINGS

The proposed solutions for producing unvarying load current is explained by the following descriptions and the drawings of.

DETAILED DESCRIPTION

Figure 1A:
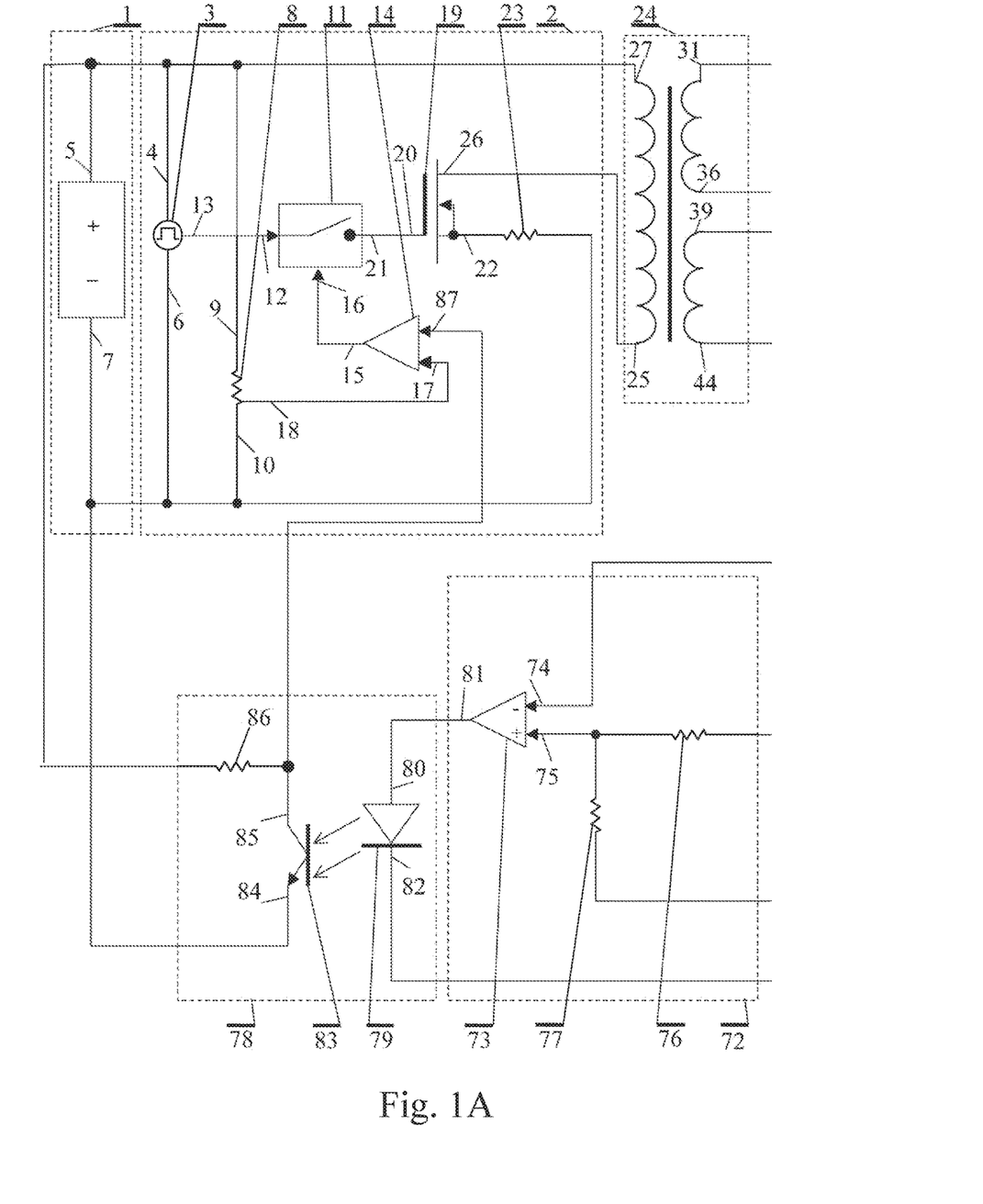
FIGS. 1a and 1b, to be viewed together, which are schematic diagrams of the first solution of the proposed apparatus for producing unvarying load current.
Figure 1B:
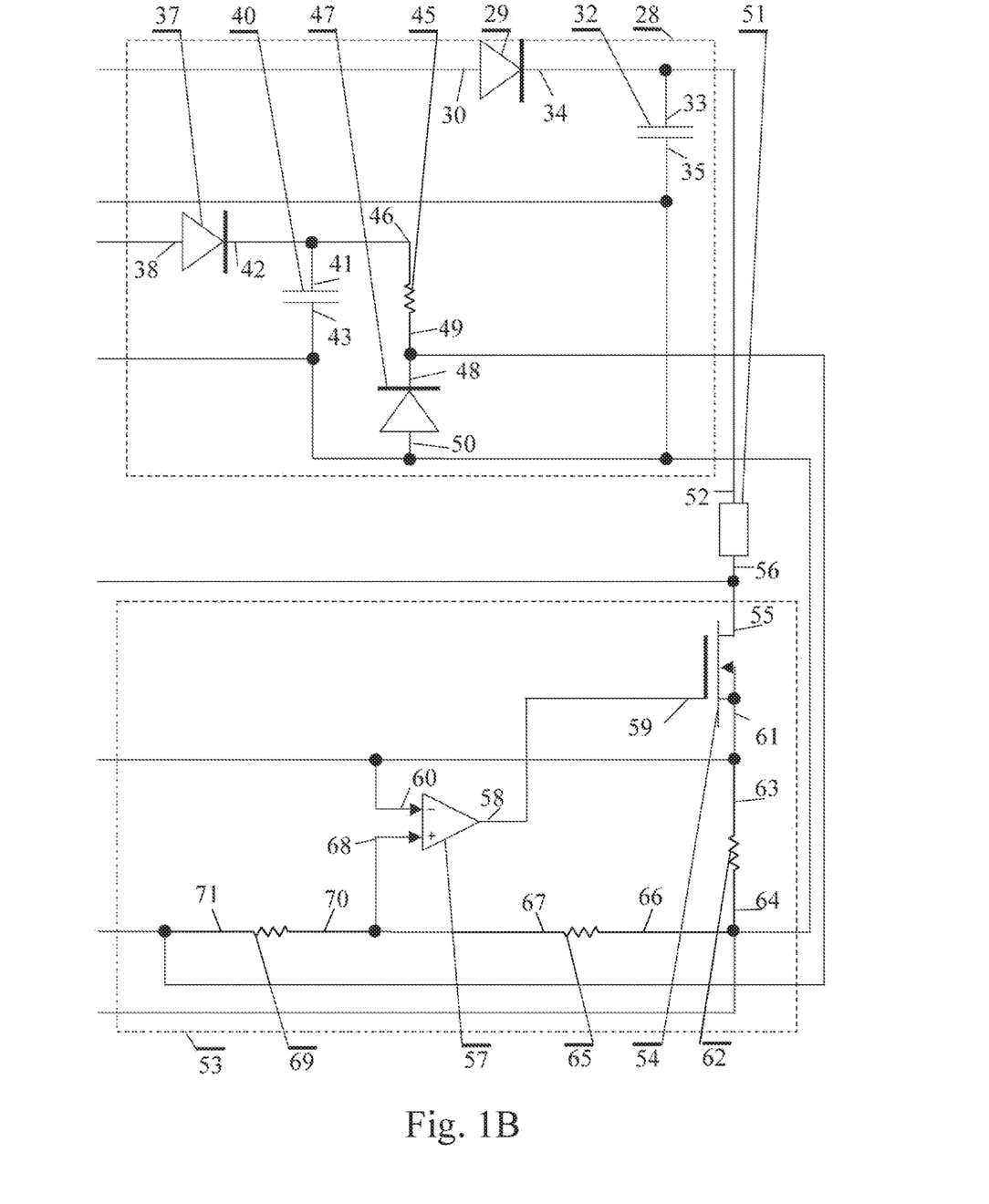

The present apparatus for producing unvarying load current according to the first solution (FIGS. 1a and 1b) of the proposed solutions comprises:

a DC voltage source 1 which is produced by any known method, for example, using a full-wave rectifying circuit with a filter;

a DC-voltage-to-pulse-voltage converter (DCPVC) 2 comprising, for example: a generator 3 of rectangular pulses at constant frequency connected by one its terminal 4 (which is a first input of the DCPVC 2) to a positive terminal 5 of the DC voltage source 1 and by another its terminal 6 to a negative terminal 7 of the DC voltage source 1, a reference voltage source 8 connected by one its terminal 9 to the positive terminal 5 of the DC voltage source 1 and by another its terminal 10 to a negative terminal 7 of the DC voltage source 1, a controllable switch 11 connected by its input 12 to an output 13 of the generator 3 of rectangular pulses at constant frequency, an operational amplifier 14 connected by its output 15 to a control input 16 of the controllable switch 11 and by its non-inverting ("+") input 17 to an output 18 of the reference voltage source 8, and a MOS transistor 19 connected by its gate 20 to an output 21 of the controllable switch 11 and by its source 22 via a resistor 23 to the negative terminal 7 of the DC voltage source 1;

a first galvanic decoupler including a transformer 24 connected by one terminal 25 of its primary winding to the drain 26 of the MOS transistor 19 and by another terminal 27 of its primary winding to the positive terminal 5 of the DC voltage source 1;

a pulse-voltage-to-DC-voltage converter (PDCVC) 28 comprising, for example: a diode 29 connected by its anode 30 (an input of the PDCVC 28) to one terminal 31 of the secondary winding of the transformer 24 of the first galvanic decoupler, a capacitor 32 connected by one its terminal 33 to a cathode 34 of the diode 29 and by another its terminal 35 to another terminal 36 of the secondary winding of the transformer 24 of the first galvanic decoupler, an auxiliary DC voltage source comprising, for example: a diode 37 connected by its anode 38 to one terminal 39 of a third winding of the transformer 24 of the first galvanic decoupler, a capacitor 40 connected by one its terminal 41 to a cathode 42 of the diode 37 and by another its terminal 43 to another terminal 44 of the third winding of the transformer 24 of the first galvanic decoupler, a resistor 45 connected by one its terminal 46 to the cathode 42 of the diode 37, and a Zener diode 47 connected by its cathode 48 to another terminal 49 of the resistor 45 and by its anode 50 to the other terminal 43 of the capacitor 40;

a load 51, connected by one its terminal 52 to the cathode 34 of the diode 29, which is the output of the PDCVC 28;

a DC stabilizer 53 comprising, for example a MOS transistor 54 connected by its drain 55 to the second terminal 56 of the load 51, an operational amplifier 57 connected by its output 58 to a gate 59 of the MOS transistor 54 and connected by its inverting ("−") input 60 to a source 61 of the MOS transistor 54, a first resistor 62 connected by one its terminal 63 to a source 61 of the MOS transistor 54 and by another its terminal 64 to the anode 50 of the Zener diode 47 of the auxiliary DC voltage source and to the other terminal 35 of the capacitor 32 of the PDCVC 28, a second resistor 65 connected by one its terminal 66 to the other terminal 64 of the first resistor 62 and connected by another its terminal 67 to an non-inverting ("+") input 68 of the operational amplifier 57, and a third resistor 69 connected by one its terminal 70 to the other terminal 67 of the second resistor 65 and by another its terminal 71 to the cathode 48 of the Zener diode 47 of the auxiliary DC voltage source;

a control circuit 72 comprising, for example, an operational amplifier 73 connected by its inverting ("−") input 74 (which is a first input of the control circuit 72) to the second terminal 56 of the load 51 and connected by its non-inverting ("+") input 75 via a first resistor 76 (which is a second input of the control circuit 72) to the source 61 of the MOS transistor 54 of the DC stabilizer 53 and via a second resistor 77 to the other terminal 71 of the third resistor 69 of the DC stabilizer 53;

a second galvanic decoupler 78 comprising, for example, a light-emitting diode (LED) 79, which is connected by its anode 80 (which is an input of the second galvanic decoupler 78) to an output 81 of the operational amplifier 73 of the control circuit 72 and by its cathode 82 to the other terminal 64 of the first resistor 62 of the DC stabilizer 53, and a phototransistor 83, which is connected by one its terminal 84 to the negative terminal 7 of the DC voltage source 1 and by another its terminal 85 via a resistor 86 to the positive terminal 5 of the DC voltage source 1 and to an inverting ("−") input 87 of the operational amplifier 14 of the DCPVC 2, the input 87 being a control input of the DCPVC 2.

The proposed apparatus for producing an unvarying direct load current according to the first solution (FIGS. 1a and 1b) operates as follows.

At applying DC voltage from the terminals 5 and 7 of the DC voltage source 1 to the inputs 4 and 6 of generator 3 of rectangular pulses at constant frequency (which are the inputs of the DCPVC 2), the generator 3 produces constant frequency rectangular pulses which come from the output 13 of the generator 3 to the information (data) input 12 of the controllable switch 11. As long as contacts of the switch 11 are closed, the constant frequency rectangular pulses arrive from the output 21 of the controllable switch 11 at the gate 20 of the MOS transistor 19, and from its drain 26 they arrive at the terminal 25 of the primary winding of the transformer 24 of the first galvanic decoupler.

As soon as the constant frequency rectangular pulses appear at the terminals 31, 36 of the secondary winding of the transformer 24 of the first galvanic decoupler, as well as at the inputs (at the anode 30 of the diode 29 and at the terminal 35 of the capacitor 32) of the PDCVC 28, a conversion occurs of those pulses into DC voltage. After the DC voltage appears at the output of the PDCVC 28 (at the cathode 34 of the diode 29), it is applied to the first terminal 52 of the load 51.

The DC voltage—obtained after the constant frequency rectangular pulses, that arrive from the terminals 39, 44 of the third winding of the transformer 24 of the first galvanic decoupler at the inputs of the auxiliary DC voltage source (at the anode 38 of the diode 37 and the terminal 43 of the capacitor 40), were converted into the DC voltage—is applied from the first output of the auxiliary DC voltage source (the terminal 48 of the cathode of the Zener diode 47) to the resistors 69 and 77, and from its second output (the terminal 50 of the anode of the Zener diode 47) to the terminal 64 of the first resistor 62 and to the terminal 66 of the second resistor 65 of the DC stabilizer 53, as well as to the cathode 82 of the LED 79 of the second galvanic decoupler 78.

The DC voltage comes from the second terminal 56 of the load 51 to the input of the DC stabilizer 53, namely to the drain 55 of the MOS transistor 54 of the DC stabilizer 53, where a voltage across the first resistor 62 is stabilized by means of a voltage stabilizer made of the operational amplifier 57, MOS transistor 54, second 65 and third 69 resistors fed from the terminal 48 (the cathode of the Zener diode 47, which is the output of the auxiliary DC voltage source). As a result, the current flowing through the first resistor 62 will depend neither on the voltage at the input of the DC stabilizer 53 nor on the load 51, and its value will be defined by the value of the first resistor 62 and the value of the voltage at the input 68 of the operational amplifier 57 of the DC stabilizer 53, which input is a midpoint of the voltage divider made by the second 65 and third 69 resistors of the DC stabilizer 53.

In this process, if the voltage at the second resistor 65 connected to the non-inverting ("+") input 68 of the operational amplifier 57 of the DC stabilizer 53 is higher than the voltage at the inverting ("−") input 60 of the operational amplifier 57 connected to the source 61 of the MOS transistor 54 and to the first resistor 62 of the DC stabilizer 53, then the voltage at the output 58 of the operational amplifier 57 connected to the gate 59 of the MOS transistor 54 will be of such value that the MOS transistor 54 opens, and the voltage at the first resistor 62 will increase until it becomes equal to the voltage at the second resistor 65. At this moment, the voltage at the output 58 of the operational amplifier 57 and, respectively, at the source 61 of the MOS transistor 4 will stop raising and will be of such value where the voltage at the point of connection of the source 61 of the MOS transistor 54 and the first resistor 62 is equal to that at the non-inverting ("+") input 68 of the operational amplifier 57 which is equal to the voltage at the second resistor 65. This state will stay under changes of the input voltage of the DC stabilizer 53 and under changes of the load 51, from which it follows that when the load varies, a direct stabilized (unvarying) current, whose value is defined by the value of the voltage across the second resistor 65 and value of the first resistor 62, will flow therethrough.

At the same time, to stabilize voltage at the DC stabilizer 53, the DC voltage that came from the drain 55 of the MOS transistor 54 (from the second terminal 56 of the load 51) to the first input of the control circuit 72 (to the inverting ("−") input 74 of the operational amplifier 73 of the control circuit 72) is compared with the voltage that came from the source 61 of the MOS transistors 54 of the DC stabilizer 53, which is the output of the DC stabilizer 53, to the non-inverting ("+") input 75 of the operational amplifier 73 of the control circuit 72 via the first resistor 76, whose second terminal is the second input of the control circuit 72, and the voltage resulting from the comparison is applied from the output 81 of the operational amplifier 73—by means of the second galvanic decoupler 78, which allows transmitting a control signal with no electric contact between the control circuit and DCPVC 2,—to the control input of the DCPVC 2, namely to the inverting ("−") input 87 of the operational amplifier 14 of the DCPVC 2. And as long as the voltage at the inverting ("−") input 74 of the operational amplifier 73 of the control circuit 72 is lower that the voltage at the non-inverting ("+") input 75 of the operational amplifier 73, there will be high voltage at the output 81 of the operational amplifier 73. As a consequence of this, the voltage at the inverting ("−") input 87 of the operational amplifier 14 of the DCPVC 2 is lower than the voltage at the non-inverting ("+") input 17 of the operational amplifier 14 connected to the output 18 of the reference voltage source 8. Thus, there will be high voltage at the output 15 of the operational amplifier 14 and the controllable switch 11 of the DCPVC 2 stays closed to allow pulses from the generator 3 of rectangular pulses at constant frequency of the DCPVC 2 to pass through the controllable switch 11 and the MOS transistor 19 to the first galvanic decoupler and, respectively, to the inputs of the PDCVC 28 (anode 30 of the diode 29 and the terminal 35 of the capacitor 32), the DC voltage appearing at the output of the PDCVC 28 (the cathode 34 of the diode 29) and coming to the load 51 and DC stabilizer 53.

As this takes place, the appearing of the pulses with changing pulse ratio at the inputs of the PDCVC 28 will result, after those pulses have been converted and filtered, in the increase of the output voltage of the PDCVC 28. This process will continue until the voltage at the drain 55 of the MOS transistor 54 of the DC stabilizer 53 relative to the source 61 thereof becomes equal or higher than the voltage across the first resistor 76 of the control circuit 72.

As soon as this occurs, the voltage at the inverting ("−") input 74 of the operational amplifier 73 of the control circuit 72 becomes higher than the voltage at the non-inverting ("+") input 75 of the operational amplifier 73 of the control circuit 72, and there will be voltage of such value at the output 81 thereof connected via the second galvanic decoupler 78 to the control input of the DCPVC 2 (namely to the inverting ("−") input 87 of the operational amplifier 14) that the voltage at the inverting ("−") input 87 of the operational amplifier 14 of the DCPVC 2 will increase and become higher than the voltage at the non-inverting ("+") input 17 of the operational amplifier 14 of the DCPVC 2.

Consequently, a low control voltage will exist at the output 15 of the operational amplifier 14 of the DCPVC 2, the controllable switch 11 will open, and the pulses from the generator 3 of rectangular pulses at constant frequency will cease coming to the gate 20 of the MOS transistor 19 of the DCPVC 2. Thus, the voltage at the output of the PDCVC 28 (the cathode 34 of the diode 29), as well as at the drain 55 of the MOS transistor 54 of the DC stabilizer 53 will stop increasing and start decreasing. For that reason, the voltage at the inverting ("−") input 87 of the operational amplifier 14 will again become lower than that at the non-inverting ("+") input 17 of the operational amplifier 14 of the DCPVC 2, and the whole process will recur.

In this way, the operational amplifier 14 of the DCPVC 2 performs the comparison of the voltages at the output 18 of the reference voltage source 8 and the output voltage of the control circuit 72 transmitted by means of the second galvanic decoupler 78 (which provides the transmission of the control signal with no galvanic contact between the control circuit 72 and the DCPVC 2) and generates the control voltage at its output 15 appearing at the control input 16 of the controllable switch 11. The latter closes or opens its contacts and thus changes the pulse ratio of the pulses coming to the gate 20 of the MOS transistor 19 of the DCPVC 2.

These pulses come via the first galvanic decoupler (the transformer 24) from the drain 26 of the MOS transistor 19 to the input 30 of the PCDVC 28, and, after the respective conversion and filtration, the DC voltage at the output of the PCDVC 28 (the cathode 34 of the diode 29) will again start to increase. Thus, the voltage between the drain 55 and source 61 of the MOS transistor 54 of the DC stabilizer 53 will be equal to about the voltage value across the first resistor 76 of the control circuit 72, whereas the current flowing through the load 51 will not depend on the changes of the load 51, as well as the voltage across the DC stabilizer 53 will not depend of the value of the load (51).

Figure 2A:
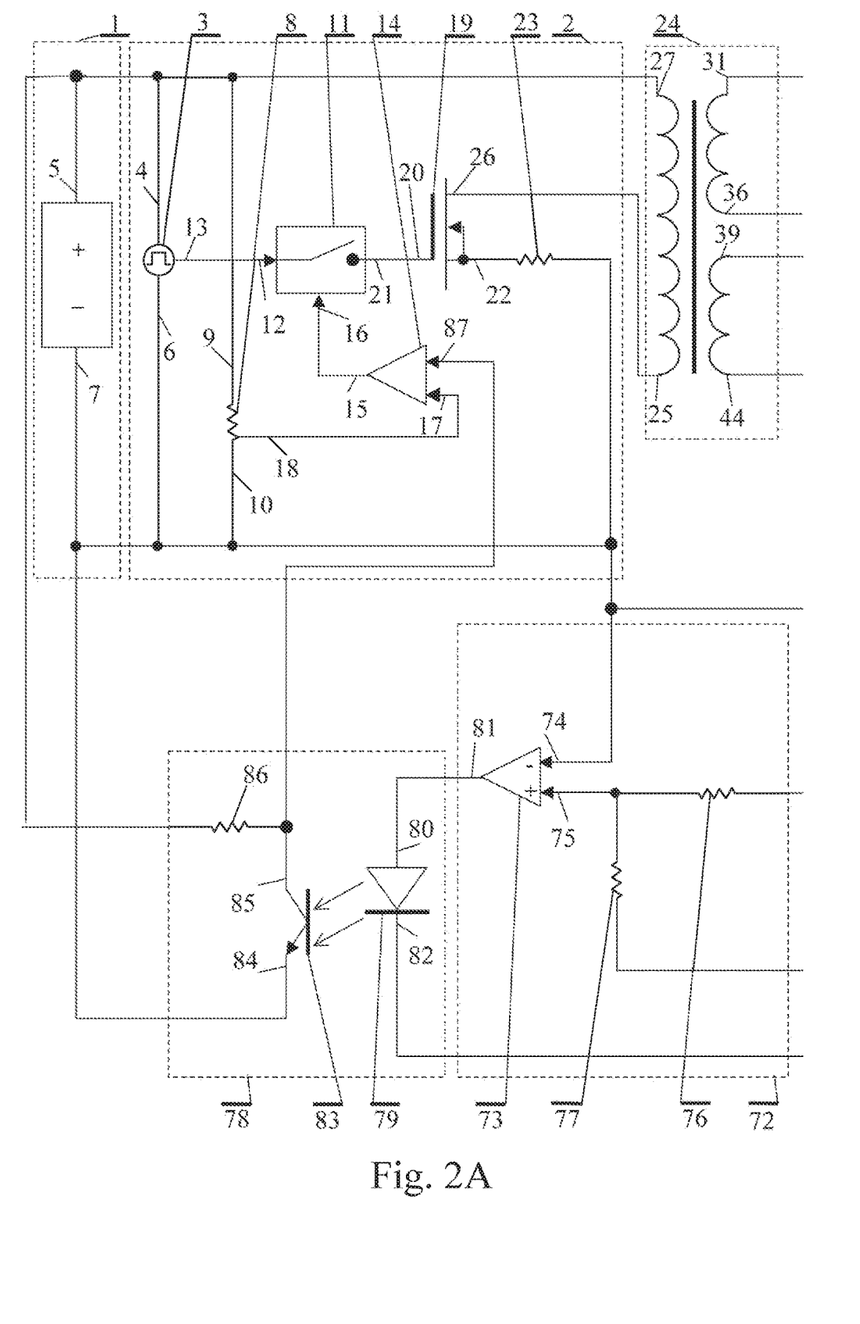
FIGS. 2a and 2b, to be viewed together, which are schematic diagrams of the second solution of the proposed apparatus for producing unvarying load current.
Figure 2B:
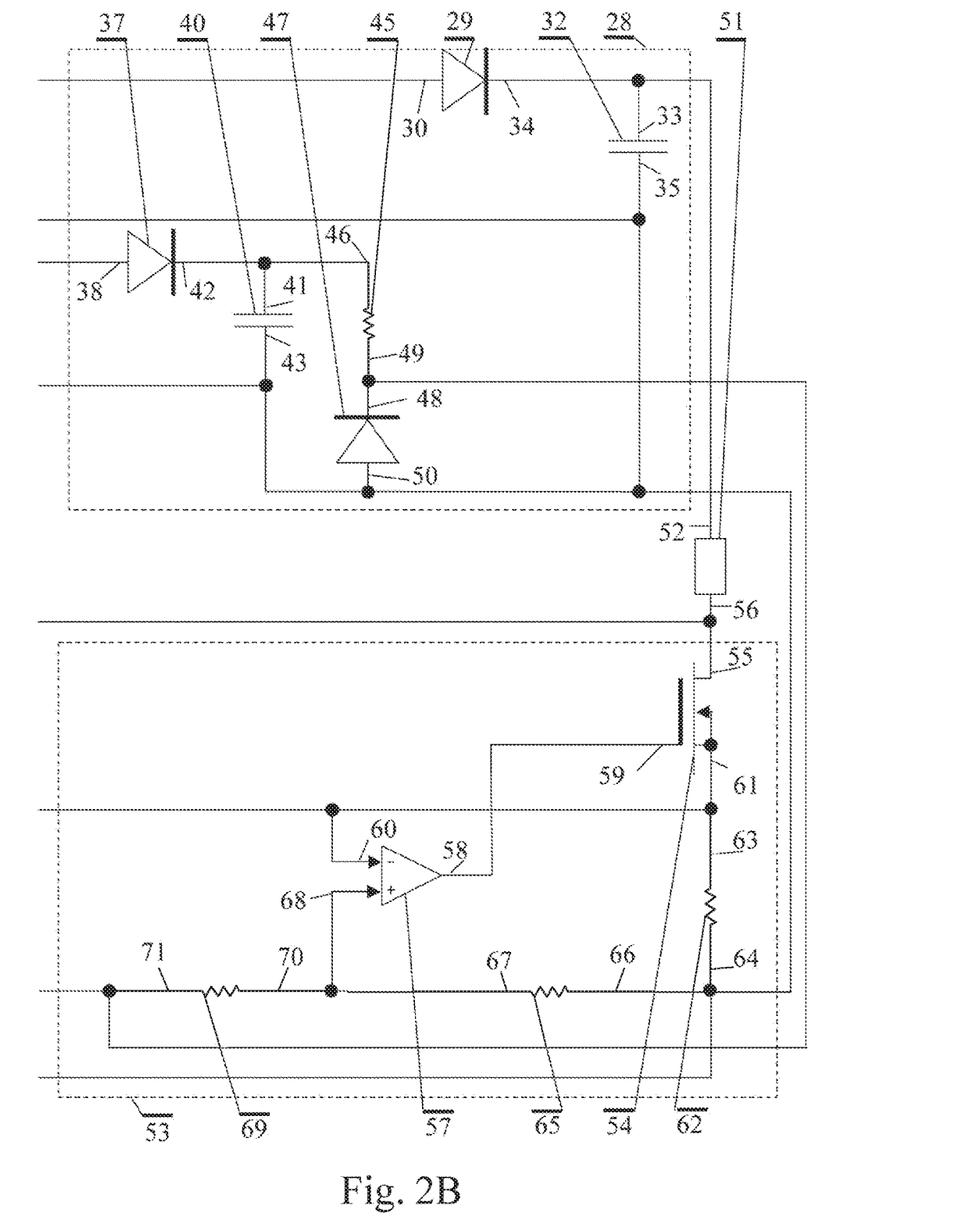

The present apparatus for producing unvarying load current per the second solution of the proposed solutions (FIGS. 2a and 2b) comprises:

a DC voltage source 1 which is produced by any known method, for example, using a full-wave rectifying circuit with a filter;

a DC-voltage-to-pulse-voltage converter (DCPVC) 2 comprising, for example: a generator 3 of rectangular pulses at constant frequency connected by one its terminal 4 (which is a first input of the DCPVC 2) to a positive terminal 5 of the DC voltage source 1 and by another its terminal 6 to a negative terminal 7 of the DC voltage source 1, a reference voltage source 8 connected by one its terminal 9 to the positive terminal 5 of the DC voltage source 1 and by another its terminal 10 to a negative terminal 7 of the DC voltage source 1, a controllable switch 11 connected by its input 12 to an output 13 of the generator 3 of rectangular pulses at constant frequency, an operational amplifier 14 connected by its output 15 to a control input 16 of the controllable switch 11 and by its non-inverting ("+") input 17 to an output 18 of the reference voltage source 8, and a MOS transistor 19 connected by its gate 20 to an output 21 of the controllable switch 11 and by its source 22 via a resistor 23 to the negative terminal 7 of the DC voltage source 1;

a first galvanic decoupler including a transformer 24 connected by one terminal 25 of its primary winding to the drain 26 of the MOS transistor 19 and by another terminal 27 of its primary winding to the positive terminal 5 of the DC voltage source 1;

a pulse-voltage-to-DC-voltage converter (PDCVC) 28 comprising, for example: a diode 29 connected by its anode 30 (an input of the PDCVC 28) to one terminal 31 of the secondary winding of the transformer 24 of the first galvanic decoupler, a capacitor 32 connected by one its terminal 33 to a cathode 34 of the diode 29 and by another its terminal 35 to another terminal 36 of the secondary winding of the transformer 24 of the first galvanic decoupler, an auxiliary DC voltage source comprising, for example: a diode 37 connected by its anode 38 to one terminal 39 of a third winding of the transformer 24 of the first galvanic decoupler, a capacitor 40 connected by one its terminal 41 to a cathode 42 of the diode 37 and by another its terminal 43 to another terminal 44 of the third winding of the transformer 24 of the first galvanic decoupler, a resistor 45 connected by one its terminal 46 to the cathode 42 of the diode 37, and a Zener diode 47 connected by its cathode 48 to another terminal 49 of the resistor 45 and by its anode 50 to the other terminal 43 of the capacitor 40;

a load 51, connected by one its terminal 52 to the cathode 34 of the diode 29, which is the output of the PDCVC 28;

a DC stabilizer 53 comprising, for example a MOS transistor 54 connected by its drain 55 to the second terminal 56 of the load 51 and to the negative terminal 7 of the DC voltage source 1, an operational amplifier 57 connected by its output 58 to a gate 59 of the MOS transistor 54 and connected by its inverting ("−") input 60 to a source 61 of the MOS transistor 54, a first resistor 62 connected by one its terminal 63 to a source 61 of the MOS transistor 54 and by another its terminal 64 to the anode 50 of the Zener diode 47 of the auxiliary DC voltage source and to the other terminal 35 of the capacitor 32 of the PDCVC 28, a second resistor 65 connected by one its terminal 66 to the other terminal 64 of the first resistor 62 and connected by another its terminal 67 to an non-inverting ("+") input 68 of the operational amplifier 57, and a third resistor 69 connected by one its terminal 70 to the other terminal 67 of the second resistor 65 and by another its terminal 71 to the cathode 48 of the Zener diode 47 of the auxiliary DC voltage source;

a control circuit 72 comprising, for example, an operational amplifier 73 connected by its inverting ("−") input 74 (which is a first input of the control circuit 72) to the second terminal 56 of the load 51 and connected by its non-inverting ("+") input 75 via a first resistor 76 (which is a second input of the control circuit 72) to the source 61 of the MOS transistor 54 of the DC stabilizer 53 and via a second resistor 77 to the other terminal 71 of the third resistor 69 of the DC stabilizer 53;

a second galvanic decoupler 78 comprising, for example, a light-emitting diode (LED) 79, which is connected by its anode 80 (which is an input of the second galvanic decoupler 78) to an output 81 of the operational amplifier 73 of the control circuit 72 and by its cathode 82 to the other terminal 64 of the first resistor 62 of the DC stabilizer 53, and a phototransistor 83, which is connected by one its terminal 84 to the negative terminal 7 of the DC voltage source 1 and by another its terminal 85 via a resistor 86 to the positive terminal 5 of the DC voltage source 1 and to an inverting ("−") input 87 of the operational amplifier 14 of the DCPVC 2, the input 87 being a control input of the DCPVC 2.

The proposed apparatus for producing an unvarying direct load current per the second solution (FIGS. 2a and 2b) operates as follows.

At applying DC voltage from the terminals 5 and 7 of the DC voltage source 1 to the inputs 4 and 6 of generator 3 of rectangular pulses at constant frequency (which are the inputs of the DCPVC 2), the generator 3 produces constant frequency rectangular pulses which come from the output 13 of the generator 3 to the information (data) input 12 of the controllable switch 11. As long as contacts of the switch 11 are closed, the constant frequency rectangular pulses arrive from the output 21 of the controllable switch 11 at the gate 20 of the MOS transistor 19, and from its drain 26 they arrive at the terminal 25 of the primary winding of the transformer 24 of the first galvanic decoupler.

As soon as the constant frequency rectangular pulses appear at the terminals 31, 36 of the secondary winding of the transformer 24 of the first galvanic decoupler, as well as at the inputs (at the anode 30 of the diode 29 and at the terminal 35 of the capacitor 32) of the PDCVC 28, a conversion occurs of those pulses into DC voltage. After the DC voltage appears at the output of the PDCVC 28 (at the cathode 34 of the diode 29), it ends up applied to the first terminal 52 of the load 51.

The DC voltage—obtained after the constant frequency rectangular pulses, that arrive from the terminals 39, 44 of the third winding of the transformer 24 of the first galvanic decoupler at the inputs of the auxiliary DC voltage source (at the anode 38 of the diode 37 and the terminal 43 of the capacitor 40), were converted into the DC voltage is applied from the first output of the auxiliary DC voltage source (the terminal 48 of the cathode of the Zener diode 47) to the resistors 69 and 77, and from its second output (the terminal 50 of the anode of the Zener diode 47) to the terminal 64 of the first resistor 62 and to the terminal 66 of the second resistor 65 of the DC stabilizer 53, as well as to the cathode 82 of the LED 79 of the second galvanic decoupler 78.

The DC voltage comes from the second terminal 56 of the load 51 to the input of the DC stabilizer 53, namely to the drain 55 of the MOS transistor 54 of the DC stabilizer 53, where a voltage across the first resistor 62 is stabilized by means of a voltage stabilizer made of the operational amplifier 57, MOS transistor 54, second 65 and third 69 resistors fed from the terminal 48 (the cathode of the Zener diode 47, which is the output of the auxiliary DC voltage source). As a result, the current flowing through the first resistor 62 will depend neither on the voltage at the input of the DC stabilizer 53 nor on the load 51, and its value will be defined by the value of the first resistor 62 and the value of the voltage at the input 68 of the operational amplifier 57 of the DC stabilizer 53, which input is a midpoint of the voltage divider made by the second 65 and third 69 resistors of the DC stabilizer 53.

In this process, if the voltage at the second resistor 65 connected to the non-inverting ("+") input 68 of the operational amplifier 57 of the DC stabilizer 53 is higher than the voltage at the inverting ("−") input 60 of the operational amplifier 57 connected to the source 61 of the MOS transistor 54 and to the first resistor 62 of the DC stabilizer 53, then the voltage at the output 58 of the operational amplifier 57 connected to the gate 59 of the MOS transistor 54 will be of such value that the MOS transistor 54 opens, and the voltage at the first resistor 62 will increase until it becomes equal to the voltage at the second resistor 65. At this moment, the voltage at the output 58 of the operational amplifier 57 and, respectively, at the source 61 of the MOS transistor 4 will stop raising and will be of such value where the voltage at the point of connection of the source 61 of the MOS transistor 54 and the first resistor 62 is equal to that at the non-inverting ("+") input 68 of the operational amplifier 57 which is equal to the voltage at the second resistor 65. This state will stay under changes of the input voltage of the DC stabilizer 53 and under changes of the load 51, from which it follows that when the load varies, a direct stabilized (unvarying) current, whose value is defined by the value of the voltage across the second resistor 65 and value of the first resistor 62, will flow therethrough.

At the same time, to stabilize voltage at the DC stabilizer 53, the DC voltage that came from the drain 55 of the MOS transistor 54 (from the second terminal 56 of the load 51) to the first input of the control circuit 72 (to the inverting ("−") input 74 of the operational amplifier 73 of the control circuit 72) is compared with the voltage that came from the source 61 of the MOS transistors 54 of the DC stabilizer 53, which is the output of the DC stabilizer 53, to the non-inverting ("+") input 75 of the operational amplifier 73 of the control circuit 72 via the first resistor 76, whose second terminal is the second input of the control circuit 72, and the voltage resulting from the comparison is applied from the output 81 of the operational amplifier 73 by means of the second galvanic decoupler 78, which allows transmitting a control signal with no electric contact between the control circuit and DCPVC 2,—to the control input of the DCPVC 2, namely to the inverting ("−") input 87 of the operational amplifier 14 of the DCPVC 2. And as long as the voltage at the inverting ("−") input 74 of the operational amplifier 73 of the control circuit 72 is lower that the voltage at the non-inverting ("+") input 75 of the operational amplifier 73, there will be high voltage at the output 81 of the operational amplifier 73. As a consequence of this, the voltage at the inverting ("−") input 87 of the operational amplifier 14 of the DCPVC 2 is lower than the voltage at the non-inverting ("+") input 17 of the operational amplifier 14 connected to the output 18 of the reference voltage source 8. Thus, there will be high voltage at the output 15 of the operational amplifier 14 and the controllable switch 11 of the DCPVC 2 stays closed to allow pulses from the generator 3 of rectangular pulses at constant frequency of the DCPVC 2 to pass through the controllable switch 11 and the MOS transistor 19 to the first galvanic decoupler and, respectively, to the inputs of the PDCVC 28 (anode 30 of the diode 29 and the terminal 35 of the capacitor 32), the DC voltage appearing at the output of the PDCVC 28 (the cathode 34 of the diode 29) and coming to the load 51 and DC stabilizer 53.

As this takes place, the appearing of the pulses with changing pulse ratio at the inputs of the PDCVC 28 will result, after those pulses have been converted and filtered, in the increase of the output voltage of the PDCVC 28. This process will continue until the voltage at the drain 55 of the MOS transistor 54 of the DC stabilizer 53 relative to the source 61 thereof becomes equal or higher than the voltage across the first resistor 76 of the control circuit 72.

As soon as this occurs, the voltage at the inverting ("−") input 74 of the operational amplifier 73 of the control circuit 72 becomes higher than the voltage at the non-inverting ("+") input 75 of the operational amplifier 73 of the control circuit 72, and there will be voltage of such value at the output 81 thereof connected via the second galvanic decoupler 78 to the control input of the DCPVC 2 (namely to the inverting ("−") input 87 of the operational amplifier 14) that the voltage at the inverting ("−") input 87 of the operational amplifier 14 of the DCPVC 2 will increase and become higher than the voltage at the non-inverting ("+") input 17 of the operational amplifier 14 of the DCPVC 2.

Consequently, a low control voltage will exist at the output 15 of the operational amplifier 14 of the DCPVC 2, the controllable switch 11 will open, and the pulses from the generator 3 of rectangular pulses at constant frequency will cease coming to the gate 20 of the MOS transistor 19 of the DCPVC 2. Thus, the voltage at the output of the PDCVC 28 (the cathode 34 of the diode 29), as well as at the drain 55 of the MOS transistor 54 of the DC stabilizer 53 will stop increasing and start decreasing. For that reason, the voltage at the inverting ("−") input 87 of the operational amplifier 14 will again become lower than that at the non-inverting ("+") input 17 of the operational amplifier 14 of the DCPVC 2, and the whole process will recur.

In this way, the operational amplifier 14 of the DCPVC 2 performs the comparison of the voltages at the output 18 of the reference voltage source 8 and the output voltage of the control circuit 72 transmitted by means of the second galvanic decoupler 78 (which provides the transmission of the control signal with no galvanic contact between the control circuit 72 and the DCPVC 2) and generates the control voltage at its output 15 appearing at the control input 16 of the controllable switch 11. The latter closes or opens its contacts and thus changes the pulse ratio of the pulses coming to the gate 20 of the MOS transistor 19 of the DCPVC 2.

These pulses come via the first galvanic decoupler (the transformer 24) from the drain 26 of the MOS transistor 19 to the input 30 of the PCDVC 28, and, after the respective conversion and filtration, the DC voltage at the output of the PCDVC 28 (the cathode 34 of the diode 29) will again start to increase. Thus, the voltage between the drain 55 and source 61 of the MOS transistor 54 of the DC stabilizer 53 will be equal to about the voltage value across the first resistor 76 of the control circuit 72, whereas the current flowing through the load 51 will not depend on the changes of the load 51, as well as the voltage across the DC stabilizer 53 will not depend of the value of the load (51). With that, the current flowing through the load 51 creates a voltage drop across the load 51, and thus a potential of the first terminal 52 becomes positive relative to that of the second terminal 56 of the load 51 and, respectively, relative to the potential of the negative terminal 7 of the DC voltage source 1 connected therewith.

Figure 3A:
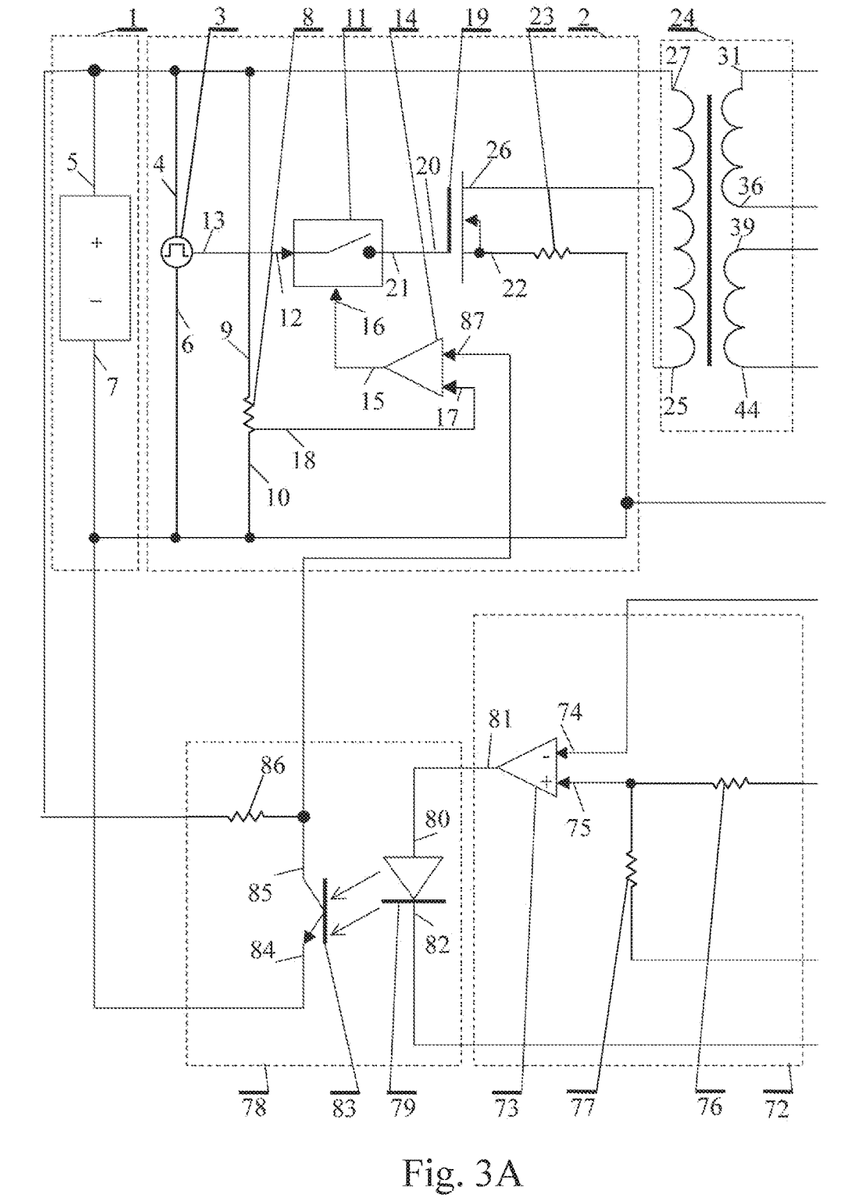
FIGS. 3a and 3b, to be viewed together, which are schematic diagrams of the third solution of the proposed apparatus for producing unvarying load current.
Figure 3B:
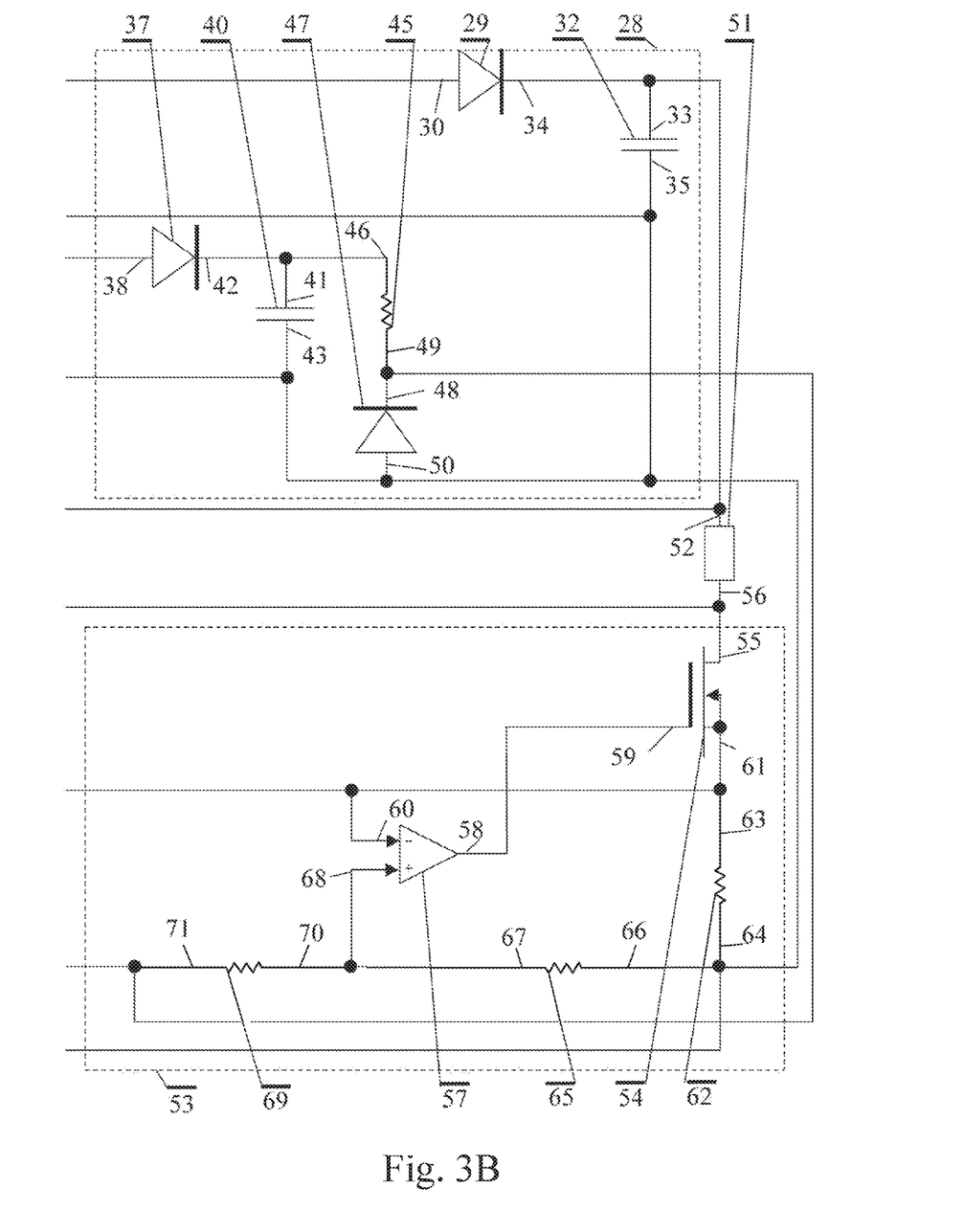

The present apparatus for producing unvarying load current per the third solution of the proposed solutions (FIGS. 3a and 3b) comprises:
- a DC voltage source 1 which is produced by any known method, for example, using a full-wave rectifying circuit with a filter;
- a DC-voltage-to-pulse-voltage converter (DCPVC) 2 comprising, for example: a generator 3 of rectangular pulses at constant frequency connected by one its terminal 4 (which is a first input of the DCPVC 2) to a positive terminal 5 of the DC voltage source 1 and by another its terminal 6 to a negative terminal 7 of the DC voltage source 1, a reference voltage source 8 connected by one its terminal 9 to the positive terminal 5 of the DC voltage source 1 and by another its terminal 10 to a negative terminal 7 of the DC voltage source 1, a controllable switch 11 connected by its input 12 to an output 13 of the generator 3 of rectangular pulses at constant frequency, an operational amplifier 14 connected by its output 15 to a control input 16 of the controllable switch 11 and by its non-inverting ("+") input 17 to an output 18 of the reference voltage source 8, and a MOS transistor 19 connected by its gate 20 to an output 21 of the controllable switch 11 and by its source 22 via a resistor 23 to the negative terminal 7 of the DC voltage source 1;
- a first galvanic decoupler including a transformer 24 connected by one terminal 25 of its primary winding to the drain 26 of the MOS transistor 19 and by another terminal 27 of its primary winding to the positive terminal 5 of the DC voltage source 1;
- a pulse-voltage-to-DC-voltage converter (PDCVC) 28 comprising, for example: a diode 29 connected by its anode 30 (an input of the PDCVC 28) to one terminal 31 of the secondary winding of the transformer 24 of the first galvanic decoupler, a capacitor 32 connected by one its terminal 33 to a cathode 34 of the diode 29 and by another its terminal 35 to another terminal 36 of the secondary winding of the transformer 24 of the first galvanic decoupler, an auxiliary DC voltage source comprising, for example: a diode 37 connected by its anode 38 to one terminal 39 of a third winding of the transformer 24 of the first galvanic decoupler, a capacitor 40 connected by one its terminal 41 to a cathode 42 of the diode 37 and by another its terminal 43 to another terminal 44 of the third winding of the transformer 24 of the first galvanic decoupler, a resistor 45 connected by one its terminal 46 to the cathode 42 of the diode 37, and a Zener diode 47 connected by its cathode 48 to another terminal 49 of the resistor 45 and by its anode 50 to the other terminal 43 of the capacitor 40;
- a load 51, connected by one its terminal 52 to the cathode 34 of the diode 29, which is the output the PDCVC 28, and to the negative terminal 7 of the DC voltage source 1;
- a DC stabilizer 53 comprising, for example a MOS transistor 54 connected by its drain 55 to the second terminal 56 of the load 51, an operational amplifier 57 connected by its output 58 to a gate 59 of the MOS transistor 54 and connected by its inverting ("−") input 60 to a source 61 of the MOS transistor 54, a first resistor 62 connected by one its terminal 63 to a source 61 of the MOS transistor 54 and by another its terminal 64 to the anode 50 of the Zener diode 47 of the auxiliary DC voltage source and to the other terminal 35 of the capacitor 32 of the PDCVC 28, a second resistor 65 connected by one its terminal 66 to the other terminal 64 of the first resistor 62 and connected by another its terminal 67 to an non-inverting ("+") input 68 of the operational amplifier 57, and a third resistor 69 connected by one its terminal 70 to the other terminal 67 of the second resistor 65 and by another its terminal 71 to the cathode 48 of the Zener diode 47 of the auxiliary DC voltage source;
- a control circuit 72 comprising, for example, an operational amplifier 73 connected by its inverting ("−") input 74 (which is a first input of the control circuit 72) to the second terminal 56 of the load 51 and connected by its non-inverting ("+") input 75 via a first resistor 76 (which is a second input of the control circuit 72) to the source 61 of the MOS transistor 54 of the DC stabilizer 53 and via a second resistor 77 to the other terminal 71 of the third resistor 69 of the DC stabilizer 53;

a second galvanic decoupler 78 comprising, for example, a light-emitting diode (LED) 79, which is connected by its anode 80 (which is an input of the second galvanic decoupler 78) to an output 81 of the operational amplifier 73 of the control circuit 72 and by its cathode 82 to the other terminal 64 of the first resistor 62 of the DC stabilizer 53, and a phototransistor 83, which is connected by one its terminal 84 to the negative terminal 7 of the DC voltage source 1 and by another its terminal 85 via a resistor 86 to the positive terminal 5 of the DC voltage source 1 and to an inverting ("−") input 87 of the operational amplifier 14 of the DCPVC 2, the input 87 being a control input of the DCPVC 2.

The proposed apparatus for producing an unvarying direct load current per the second solution (FIGS. 2a and 2b) operates as follows.

At applying DC voltage from the terminals 5 and 7 of the DC voltage source 1 to the inputs 4 and 6 of generator 3 of rectangular pulses at constant frequency (which are the inputs of the DCPVC 2), the generator 3 produces constant frequency rectangular pulses which come from the output 13 of the generator 3 to the information (data) input 12 of the controllable switch 11. As long as contacts of the switch 11 are closed, the constant frequency rectangular pulses arrive from the output 21 of the controllable switch 11 at the gate 20 of the MOS transistor 19, and from its drain 26 they arrive at the terminal 25 of the primary winding of the transformer 24 of the first galvanic decoupler.

As soon as the constant frequency rectangular pulses appear at the terminals 31, 36 of the secondary winding of the transformer 24 of the first galvanic &coupler, as well as at the inputs (at the anode 30 of the diode 29 and at the terminal 35 of the capacitor 32) of the PDCVC 28, a conversion occurs of those pulses into DC voltage. After the DC voltage appears at the output of the PDCVC 28 (at the cathode 34 of the diode 29), it ends up applied to the first terminal 52 of the load 51.

The DC voltage—obtained after the constant frequency rectangular pulses, that arrive from the terminals 39, 44 of the third winding of the transformer 24 of the first galvanic decoupler at the inputs of the auxiliary DC voltage source (at the anode 38 of the diode 37 and the terminal 43 of the capacitor 40), were converted into the DC voltage—is applied from the first output of the auxiliary DC voltage source (the terminal 48 of the cathode of the Zener diode 47) to the resistors 69 and 77, and from its second output (the terminal 50 of the anode of the Zener diode 47) to the terminal 64 of the first resistor 62 and to the terminal 66 of the second resistor 65 of the DC stabilizer 53, as well as to the cathode 82 of the LED 79 of the second galvanic decoupler 78.

The DC voltage comes from the second terminal 56 of the load 51 to the input of the DC stabilizer 53, namely to the drain 55 of the MOS transistor 54 of the DC stabilizer 53, where a voltage across the first resistor 62 is stabilized by means of a voltage stabilizer made of the operational amplifier 57, MOS transistor 54, second 65 and third 69 resistors fed from the terminal 48 (the cathode of the Zener diode 47, which is the output of the auxiliary DC voltage source). Thus, the current flowing through the first resistor 62 will depend neither on the voltage at the input of the DC stabilizer 53 nor on the load 51, and its value will be defined by the value of the first resistor 62 and the value of the voltage at the input 68 of the operational amplifier 57 of the DC stabilizer 53, which input is a midpoint of the voltage divider made by the second 65 and third 69 resistors of the DC stabilizer 53.

In this process, if the voltage at the second resistor 65 connected to the non-inverting ("+") input 68 of the operational amplifier 57 of the DC stabilizer 53 is higher than the voltage at the inverting ("−") input 60 of the operational amplifier 57 connected to the source 61 of the MOS transistor 54 and to the first resistor 62 of the DC stabilizer 53, then the voltage at the output 58 of the operational amplifier 57 connected to the gate 59 of the MOS transistor 54 will be of such value that the MOS transistor 54 opens, and the voltage at the first resistor 62 will increase until it becomes equal to the voltage at the second resistor 65. At this moment, the voltage at the output 58 of the operational amplifier 57 and, respectively, at the source 61 of the MOS transistor 54 will stop raising and will be of such value where the voltage at the point of connection of the source 61 of the MOS transistor 54 and the first resistor 62 is equal to that at the non-inverting ("+") input 68 of the operational amplifier 57 which is equal to the voltage at the second resistor 65. This state will stay under changes of the input voltage of the DC stabilizer 53 and under changes of the load 51, from which it follows that when the load varies, a direct stabilized (unvarying) current, whose value is defined by the value of the voltage across the second resistor 65 and value of the first resistor 62, will flow therethrough.

At the same time, to stabilize voltage at the DC stabilizer 53, the DC voltage that came from the drain 55 of the MOS transistor 54 (from the second terminal 56 of the load 51) to the first input of the control circuit 72 (to the inverting ("−") input 74 of the operational amplifier 73 of the control circuit 72) is compared with the voltage that came from the source 61 of the MOS transistors 54 of the DC stabilizer 53, which is the output of the DC stabilizer 53, to the non-inverting ("+") input 75 of the operational amplifier 73 of the control circuit 72 via the first resistor 76, whose second terminal is the second input of the control circuit 72, and the voltage resulting from the comparison is applied from the output 81 of the operational amplifier 73—by means of the second galvanic decoupler 78, which allows transmitting a control signal with no electric contact between the control circuit and DCPVC 2,—to the control input of the DCPVC 2, namely to the inverting ("−") input 87 of the operational amplifier 14 of the DCPVC 2. And as long as the voltage at the inverting ("−") input 74 of the operational amplifier 73 of the control circuit 72 is lower that the voltage at the non-inverting ("+") input 75 of the operational amplifier 73, there will be high voltage at the output 81 of the operational amplifier 73. As a consequence of this, the voltage at the inverting ("−") input 87 of the operational amplifier 14 of the DCPVC 2 is lower than the voltage at the non-inverting ("+") input 17 of the operational amplifier 14 connected to the output 18 of the reference voltage source 8. Thus, there will be high voltage at the output 15 of the operational amplifier 14, and the controllable switch 11 of the DCPVC 2 stays closed to allow pulses from the generator 3 of rectangular pulses at constant frequency of the DCPVC 2 to pass through the controllable switch 11 and the MOS transistor 19 to the first galvanic decoupler and, respectively, to the inputs of the PDCVC 28 (anode 30 of the diode 29 and the terminal 35 of the capacitor 32), the DC voltage appearing at the output of the PDCVC 28 (the cathode 34 of the diode 29) and coming to the load 51 and DC stabilizer 53.

As this takes place, the appearing of the pulses with changing pulse ratio at the inputs of the PDCVC 28 will result, after those pulses have been converted and filtered, in the increase of the output voltage of the PDCVC 28. This process will continue until the voltage at the drain 55 of the MOS transistor 54 of the DC stabilizer 53 relative to the source 61 thereof becomes equal or higher than the voltage across the first resistor 76 of the control circuit 72.

As soon as this occurs, the voltage at the inverting ("−") input 74 of the operational amplifier 73 of the control circuit 72 becomes higher than the voltage at the non-inverting ("+") input 75 of the operational amplifier 73 of the control circuit 72, and there will be voltage of such value at the output 81 thereof connected via the second galvanic decoupler 78 to the control input of the DCPVC 2 (namely to the inverting ("−") input 87 of the operational amplifier 14) that the voltage at the inverting ("−") input 87 of the operational amplifier 14 of the DCPVC 2 will increase and become higher than the voltage at the non-inverting ("+") input 17 of the operational amplifier 14 of the DCPVC 2.

Consequently, a low control voltage will exist at the Output 15 of the operational amplifier 14 of the DCPVC 2, the controllable switch 11 will open, and the pulses from the generator 3 of rectangular pulses at constant frequency will cease coming to the gate 20 of the MOS transistor 19 of the DCPVC 2. Thus, the voltage at the output of the PDCVC 28 (the cathode 34 of the diode 29), as well as at the drain 55 of the MOS transistor 54 of the DC stabilizer 53 will stop increasing and start decreasing. For that reason, the voltage at the inverting ("−") input 87 of the operational amplifier 14 will again become lower than that at the non-inverting (input 17 of the operational amplifier 14 of the DCPVC 2, and the whole process will recur.

In this way, the operational amplifier 14 of the DCPVC 2 performs the comparison of the voltages at the output 18 of the reference voltage source 8 and the output voltage of the control circuit 72 transmitted by means of the second galvanic decoupler 78 (which provides the transmission of the control signal with no galvanic contact between the control circuit 72 and the DCPVC 2) and generates the control voltage at its output 15 appearing at the control input 16 of the controllable switch 11. The latter closes or opens its contacts and thus changes the pulse ratio of the pulses coming to the gate 20 of the MOS transistor 19 of the DCPVC 2.

These pulses come via the first galvanic decoupler (the transformer 24) from the drain 26 of the MOS transistor 19 to the input 30 of the PCDVC 28 and, after the respective conversion and filtration, the DC voltage at the output of the PCDVC 28 (the cathode 34 of the diode 29) will again start to increase. Thus, the voltage between the drain 55 and source 61 of the MOS transistor 54 of the DC stabilizer 53 will be equal to about the voltage value across the first resistor 76 of the control circuit 72, whereas the current flowing through the load 51 will not depend on the changes of the load 51 as well as the voltage across the DC stabilizer 53 will not depend of the value of the load (51). With that, the current flowing through the load 51 creates a voltage drop across the load 51, and thus a potential of the second terminal 56 becomes negative relative to that of the first terminal 52 of the load 51 and, respectively, relative to the potential of the negative terminal 7 of the DC voltage source 1 connected therewith.

Most significantly, the maximum output voltage across the load 51 with the stabilized load current—for all the three above-discussed solutions—is limited only by the maximum admissible values of the voltages for the diode 29 and capacitor 32 in the PDCVC 28, which values can be big enough, and because of that the value of the load resistance can vary within wide ranges.

The lower limit of the load resistance is zero (a short circuit mode), the apparatus continues to work, and direct current flows from the output of the PDCVC 28 through the DC stabilizer 53, the value of this current being defined by the voltage across the second resistor 65 and the value of the first resistor 62 of the DC stabilizer 53.

The upper limit of the load resistance is defined by the ratio of the maximum permissible voltages for the diode 29 and capacitor 32 in the PDCVC 28 and the current flowing through the DC stabilizer 53.

The difference between the above disclosed solutions lies in the following:

per the first solution of the apparatus, the load 51 can be connected without regard for the polarity of the DC voltage source 1;

per the second solution, connected to the negative terminal 7 of the DC voltage source 1 is the second terminal of the load 51, whereas a positive potential relative to the negative terminal 7 of the DC voltage source 1 is created at the second terminal 56 of the load 51;

per the third solution of the apparatus, it is the first terminal 52 of the load 51 that is connected to the negative terminal 7 of the DC voltage source 1, whereas a negative potential relative to the negative terminal 7 of the DC voltage source 1 is created at the second terminal 56 of the load 51.

For that reason, the second and third solutions of the apparatus can be used in the systems that have a single power bus for both a DC voltage source and a load, voltages of various polarity being created across the load.

With the above in view, all the three above solutions of the apparatus for producing unvarying direct load current by means of stabilizing of the direct load current and stabilizing the DC voltage in the DC stabilizer secure—due to the disclosed schematics—providing unvarying value of the direct current flowing through the variable load within the wider load ranges.

The invention claimed is:

1. An apparatus for producing unvarying direct load current, the apparatus comprising:
   a DC voltage source,
   a DC-voltage-to-pulse-voltage converter connected by inputs thereof to outputs of the DC voltage source,
   a first galvanic decoupler connected by inputs thereof to outputs of the DC-voltage-to-pulse-voltage converter,
   a pulse-voltage-to-DC-voltage converter connected by inputs thereof to outputs of the first galvanic decoupler, the pulse-voltage-to-DC-voltage converter comprising an auxiliary DC voltage source connected by inputs thereof to outputs of the first galvanic decoupler,
   a load connected by a first terminal thereof to an output of the pulse-voltage-to-DC-voltage converter,
   a second galvanic decoupler,
   a control circuit comprising an operational amplifier, and
   a DC stabilizer connected by an input thereof to a second terminal of the load and to a first input of the control circuit and connected by an output thereof to a second input of the control circuit,
   the first input of the control circuit including a first input of the operational amplifier, the second input of the control circuit being also connected to an output of the auxiliary DC voltage source, a second input of the operational amplifier being connected via a resistor to the second input of the control circuit, the control circuit being connected by an output thereof to a control input of the DC-voltage-to-pulse-voltage converter, the connection of the control circuit to the DC-voltage-to-pulse-voltage converter being made via the second galvanic decoupler.

2. An apparatus for producing unvarying direct load current, the apparatus comprising:
a DC voltage source,
a DC-voltage-to-pulse-voltage converter connected by inputs thereof to outputs of the DC voltage source,
a first galvanic decoupler connected by inputs thereof to outputs of the DC-voltage-to-pulse-voltage converter,
a pulse-voltage-to-DC-voltage converter connected by inputs thereof to outputs of the first galvanic decoupler, the pulse-voltage-to-DC-voltage converter comprising an auxiliary DC voltage source connected by inputs thereof to outputs of the first galvanic decoupler,
a load connected by a first terminal thereof to an output of the pulse-voltage-to-DC-voltage converter,
a second galvanic decoupler,
a control circuit comprising an operational amplifier, and
a DC stabilizer connected by an input thereof to a second terminal of the load, to a negative terminal of the DC voltage source, and to a first input of the control circuit and connected by an output thereof to a second input of the control circuit,
the first input of the control circuit including a first input of the operational amplifier, the second input of the control circuit being also connected to an output of the auxiliary DC voltage source, a second input of the operational amplifier being connected via a resistor to the second input of the control circuit, the control circuit being connected by an output thereof to a control input of the DC-voltage-to-pulse-voltage converter, the connection of the control circuit to the DC-voltage-to-pulse-voltage converter being made via the second galvanic decoupler.

3. An apparatus for producing unvarying direct load current, the apparatus comprising:
a DC voltage source,
a DC-voltage-to-pulse-voltage converter connected by inputs thereof to outputs of the DC voltage source,
a first galvanic decoupler connected by inputs thereof to outputs of the DC-voltage-to-pulse-voltage converter,
a pulse-voltage-to-DC-voltage converter connected by inputs thereof to outputs of the first galvanic decoupler, the pulse-voltage-to-DC-voltage converter comprising an auxiliary DC voltage source connected by inputs thereof to outputs of the first galvanic decoupler,
a load connected by a first terminal thereof to an output of the pulse-voltage-to-DC-voltage converter,
a second galvanic decoupler,
a control circuit comprising an operational amplifier, and
a DC stabilizer connected by an input thereof to a second terminal of the load and to a first input of the control circuit and connected by an output thereof to a second input of the control circuit,
the first input of the control circuit including a first input of the operational amplifier, the second input of the control circuit being also connected to an output of the auxiliary DC voltage source, a second input of the operational amplifier being connected via a resistor to the second input of the control circuit, the control circuit being connected by an output thereof to a control input of the DC-voltage-to-pulse-voltage converter, the connection of the control circuit to the DC-voltage-to-pulse-voltage converter being made via the second galvanic decoupler, and wherein the first terminal of the load is also connected to a negative terminal of the DC voltage source.

* * * * *